United States Patent
Kim et al.

(10) Patent No.: US 10,833,329 B2
(45) Date of Patent: Nov. 10, 2020

(54) NICKEL-BASED ACTIVE MATERIAL FOR LITHIUM SECONDARY BATTERY, METHOD OF PREPARING THE SAME, AND LITHIUM SECONDARY BATTERY INCLUDING POSITIVE ELECTRODE INCLUDING THE NICKEL-BASED ACTIVE MATERIAL

(71) Applicant: Samsung SDI Co., Ltd., Yongin-si (KR)

(72) Inventors: Jinhwa Kim, Yongin-si (KR); Hyunbeom Kim, Yongin-si (KR); Jongmin Kim, Yongin-si (KR); Wooyoung Yang, Yongin-si (KR); Donggyu Chang, Yongin-si (KR); Jangsuk Hyun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 196 days.

(21) Appl. No.: 15/829,548

(22) Filed: Dec. 1, 2017

(65) Prior Publication Data
US 2018/0159128 A1    Jun. 7, 2018

(30) Foreign Application Priority Data
Dec. 2, 2016 (KR) .......................... 10-2016-0163897

(51) Int. Cl.
*H01M 4/525* (2010.01)
*H01M 10/052* (2010.01)
(Continued)

(52) U.S. Cl.
CPC .......... *H01M 4/525* (2013.01); *C01G 53/006* (2013.01); *C01G 53/42* (2013.01); *C01G 53/50* (2013.01);
(Continued)

(58) Field of Classification Search
CPC . H01M 10/05–0569; H01M 10/24–28; H01M 4/02–0497; H01M 4/13–1315;
(Continued)

(56) References Cited

U.S. PATENT DOCUMENTS 8,728,666 B2    5/2014    Itou et al.
9,023,531 B2    5/2015    Ueki et al.
(Continued)

FOREIGN PATENT DOCUMENTS

| CN | 102509790 | 6/2012 |
| CN | 103956479 | 7/2014 |

(Continued)

OTHER PUBLICATIONS

Machine translation of Seon, KR 10-0752703. (Year: 2007).*
(Continued)

*Primary Examiner* — Jonathan G Leong
*Assistant Examiner* — Jacob Buchanan
(74) *Attorney, Agent, or Firm* — Lewis Roca Rothgerber Christie LLP

(57) ABSTRACT

Provided are a nickel-based active material for a lithium secondary battery, a method of preparing the nickel-based active material, and a lithium secondary battery including a positive electrode including the nickel-based active material. The nickel-based active material includes at least one secondary particle that includes at least two primary particle structures, the primary particle structures each including a porous inner portion and an outer portion having a radially arranged structure, and the secondary particle including at least two radial centers.

14 Claims, 8 Drawing Sheets

(51) Int. Cl.
    *H01M 4/04*     (2006.01)
    *H01M 4/02*     (2006.01)
    *H01M 4/505*     (2010.01)
    *C01G 53/00*     (2006.01)

(52) U.S. Cl.
CPC ....... *H01M 4/0471* (2013.01); *H01M 10/052* (2013.01); *C01P 2004/03* (2013.01); *C01P 2004/20* (2013.01); *C01P 2004/22* (2013.01); *C01P 2004/24* (2013.01); *C01P 2004/32* (2013.01); *C01P 2004/50* (2013.01); *C01P 2004/51* (2013.01); *C01P 2004/54* (2013.01); *C01P 2004/61* (2013.01); *C01P 2006/16* (2013.01); *C01P 2006/40* (2013.01); *H01M 4/505* (2013.01); *H01M 2004/021* (2013.01); *H01M 2004/028* (2013.01)

(58) Field of Classification Search
CPC ......... H01M 4/139–1391; H01M 4/36; H01M 4/40–405; H01M 4/48; H01M 4/483–525
See application file for complete search history.

(56) References Cited

U.S. PATENT DOCUMENTS

| | | | |
|---|---|---|---|
| 9,871,246 B2 | 1/2018 | Kim et al. | |
| 2009/0029253 A1* | 1/2009 | Itou | H01M 4/525 |
| | | | 429/223 |
| 2010/0221613 A1* | 9/2010 | Ueki | H01M 4/661 |
| | | | 429/231.95 |
| 2012/0282522 A1 | 11/2012 | Axelbaum et al. | |
| 2013/0078520 A1 | 3/2013 | Toya et al. | |
| 2014/0186710 A1* | 7/2014 | Ryoshi | H01M 4/525 |
| | | | 429/223 |
| 2015/0093580 A1* | 4/2015 | Kobayashi | H01M 4/131 |
| | | | 428/403 |
| 2016/0036041 A1* | 2/2016 | Uwai | H01M 10/052 |
| | | | 429/223 |
| 2016/0181597 A1 | 6/2016 | Kim et al. | |
| 2016/0190573 A1 | 6/2016 | Sun et al. | |
| 2017/0222221 A1* | 8/2017 | Park | H01M 4/525 |

FOREIGN PATENT DOCUMENTS

| | | | | |
|---|---|---|---|---|
| CN | 104584283 A | | 4/2015 | |
| EP | 2975680 A1 | | 1/2016 | |
| JP | 2013-65467 A | | 4/2013 | |
| JP | 2015-76397 A | | 4/2015 | |
| KR | 10-0752703 | * | 8/2007 | ............. H01M 4/02 |
| KR | 10-2010-0056563 A | | 5/2010 | |
| KR | 10-2010-0099337 A | | 9/2010 | |
| KR | 10-2012-0084585 | * | 7/2012 | ............ H01M 4/525 |
| KR | 10-2014-0039651 A | | 4/2014 | |
| KR | 10-1605254 B1 | | 3/2016 | |
| KR | 10-2016-0049995 A | | 5/2016 | |

OTHER PUBLICATIONS

Machine translation of Seon, KR 10-2012-0084585. (Year: 2012).*
EPO Extended European Search Report dated Feb. 6, 2018, for corresponding European Patent Application No. 17204966.0 (7 pages).
Korean Office Action dated Jan. 29, 2020, for corresponding Korean Patent Application No. 10-2017-0164344, 7 pages.
EPO Office Action dated Apr. 8, 2020, for corresponding European Patent Application No. 17204966.0, 5 pages.
Chinese Office Action, with English translation, dated Sep. 1, 2020, for corresponding Chinese Patent Application No. 201711259617.5 (20 pages).

\* cited by examiner (A)  (B)  (C)

NICKEL-BASED ACTIVE MATERIAL FOR LITHIUM SECONDARY BATTERY, METHOD OF PREPARING THE SAME, AND LITHIUM SECONDARY BATTERY INCLUDING POSITIVE ELECTRODE INCLUDING THE NICKEL-BASED ACTIVE MATERIAL

CROSS-REFERENCE TO RELATED APPLICATION

This application claims priority to and the benefit of Korean Patent Application No. 10-2016-0163897, filed on Dec. 2, 2016, in the Korean Intellectual Property Office, the entire content of which is incorporated herein by reference.

BACKGROUND

1. Field

One or more embodiments of the present disclosure relate to a nickel-based active material for a lithium secondary battery, a method of preparing the same, and a lithium secondary battery including a positive electrode including the nickel-based active material.

2. Description of the Related Art

As portable electronic devices and communication devices develop, there is a high need for development of a lithium secondary battery having a high energy density. However, safety of a lithium secondary battery having a high energy density may deteriorate, and thus improvement in this regard is needed. As a positive active material of a lithium secondary battery, a lithium nickel manganese cobalt composite oxide, a lithium cobalt oxide, or the like may be used. However, when such a positive active material is used, migration distances of lithium ions are determined according to a size of a secondary particle during a charge/discharge process, and efficiency of the charge/discharge process is not high due to the physical distances. Also, a long lifespan of a lithium secondary battery is reduced due to cracks generated in primary particle units as a charge/discharge process is repeated. In addition, battery resistance increases and battery capacity characteristics do not reach a suitable and/or satisfactory level, and thus, there is a need to improve the positive active material.

SUMMARY

One or more embodiments include a nickel-based active material for a lithium secondary battery, the nickel-based active material having improved lithium ion availability.

One or more embodiments include a method of preparing the nickel-based active material.

One or more embodiments include a lithium secondary battery including a positive electrode including the nickel-based active material, wherein the lithium secondary battery has an increased discharge capacity, improved charge/discharge efficiency, and a long lifespan.

Additional aspects of embodiments will be set forth in part in the description which follows and, in part, will be apparent from the description, or may be learned by practice of the presented embodiments.

According to one or more embodiments, a nickel-based active material for a lithium secondary battery includes at least one secondary particle that includes at least two primary particle structures, the primary particle structures each including a porous inner portion and an outer portion including a radially arranged structure, and the secondary particle including at least two radial centers.

According to one or more embodiments, a method of preparing a nickel-based active material for a lithium secondary battery includes primary heat-treating a mixture of a lithium precursor and a metal hydroxide in an oxidative gas atmosphere at a temperature in a range of about 600° C. to about 850° C.; and secondary heat-treating the mixture in an oxidative gas atmosphere at a temperature in a range of about 700° C. to about 950° C. to prepare the nickel-based active material.

According to one or more embodiments, a lithium secondary battery contains a positive electrode including the nickel-based active material for a lithium secondary battery.

BRIEF DESCRIPTION OF THE DRAWINGS

These and/or other aspects of embodiments of the present disclosure will become apparent and more readily appreciated from the following description of the embodiments, taken in conjunction with the accompanying drawings in which.

DETAILED DESCRIPTION

Figure 1A:
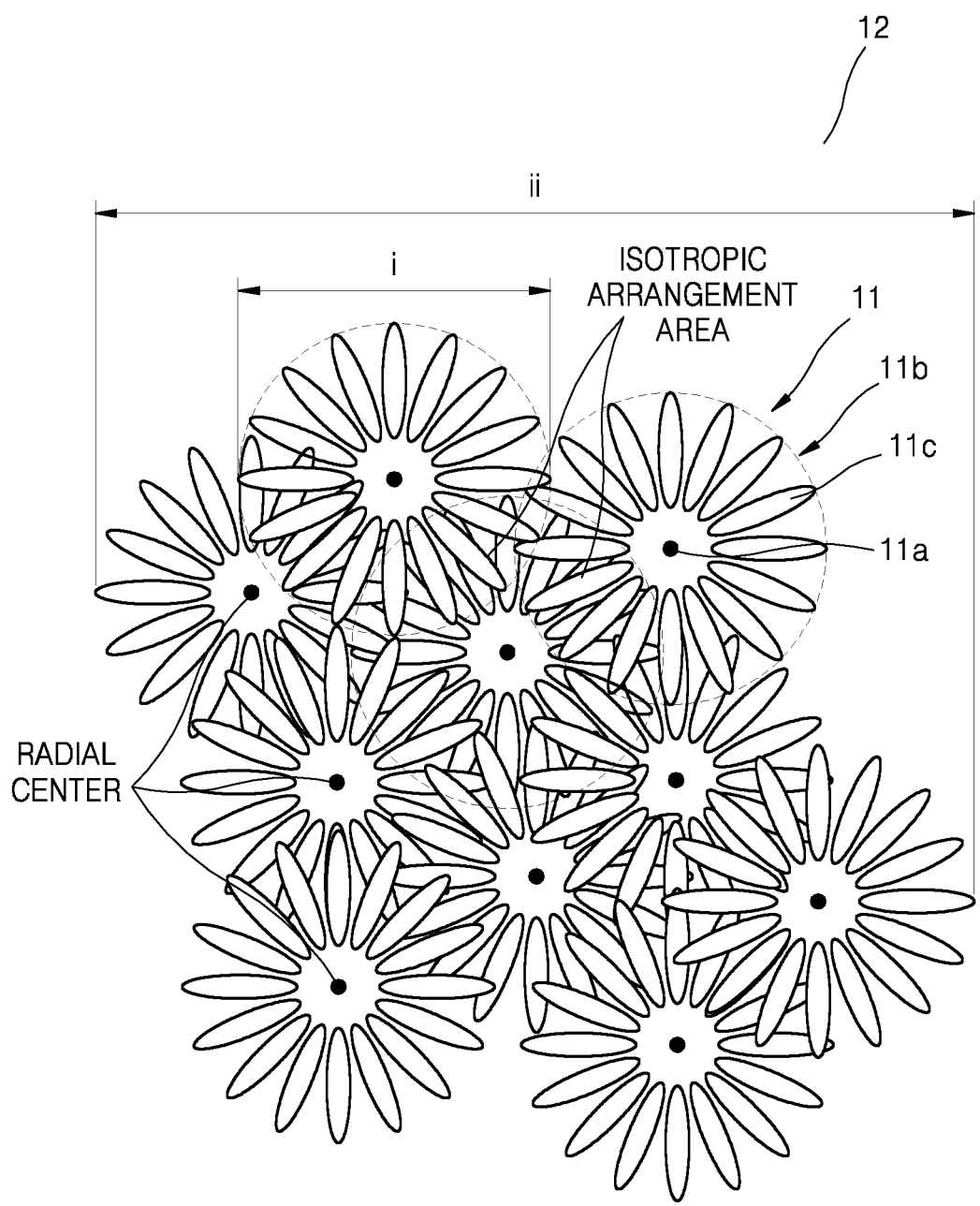
FIG. 1A is a schematic view that illustrates a structure of a nickel-based active material according to an embodiment.

Reference will now be made in more detail to embodiments of the present disclosure, examples of which are illustrated for a nickel-based active material for a lithium secondary battery, a method of preparing the nickel-based active material, and a lithium secondary battery including a positive electrode including the nickel-based active material in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

Figure 1B:
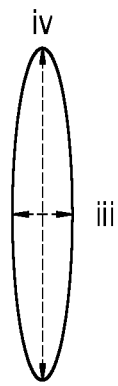
FIG. 1B is a schematic view that illustrates a plate particle constituting primary particles of the nickel-based active material shown in FIG. 1A.
Figure 1C:
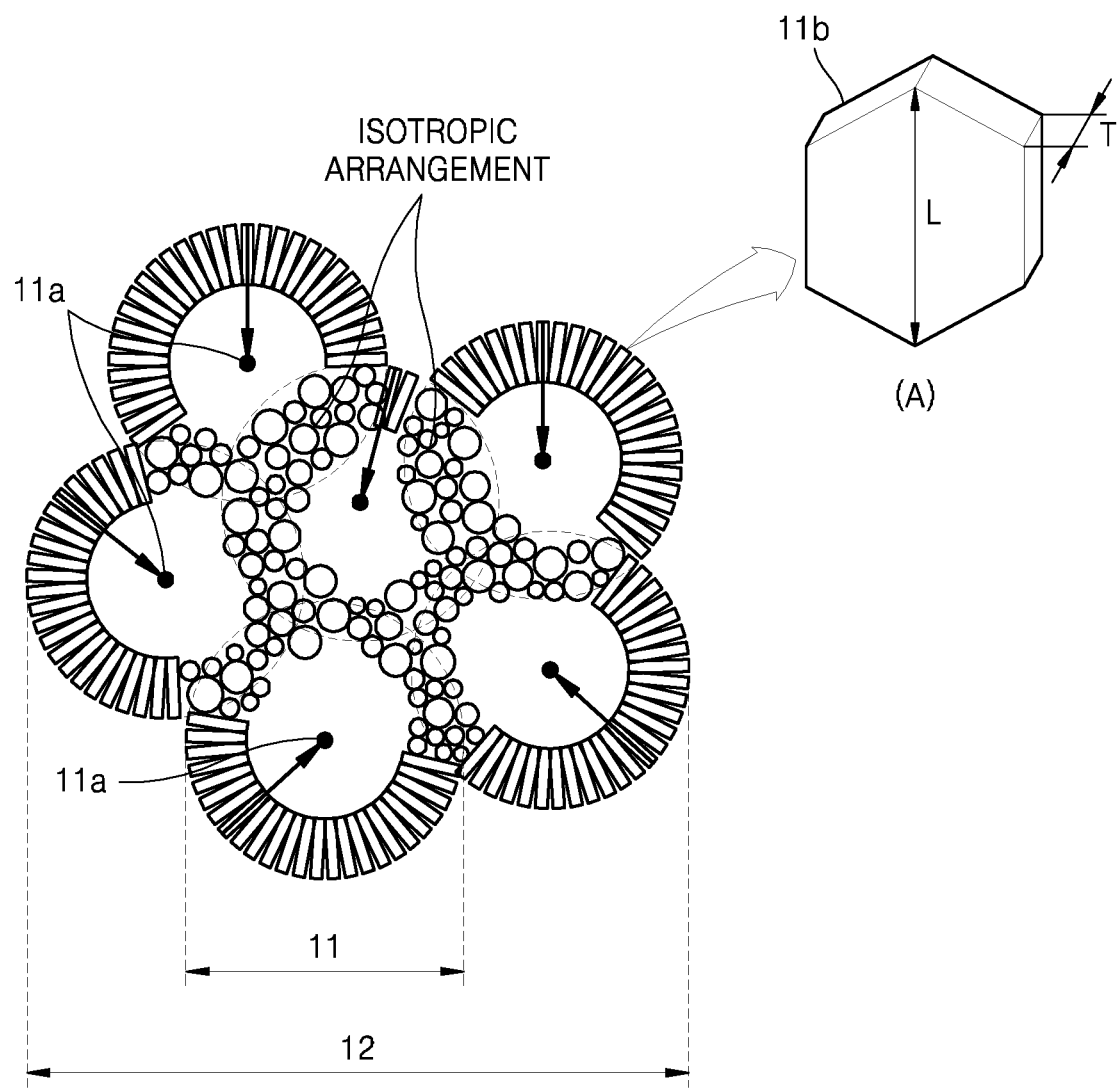
FIG. 1C is a schematic view of a structure of a cross-section taken through centers of secondary particles of a nickel-based active material according to an embodiment.

Hereinafter, referring to FIGS. 1A-1E, the nickel-based active material for a lithium secondary battery, according to the present disclosure, will be described in more detail. FIG. 1A is a schematic view that illustrates a structure of a nickel-based active material according to an embodiment. FIG. 1B is a schematic view that illustrates a plate particle constituting primary particles of a nickel-based active material shown in FIG. 1A. FIG. 1C is a schematic view of a structure of a cross-section taken through centers of secondary particles of a nickel-based active material according to an embodiment.

The nickel-based active material for a lithium secondary battery may include at least one secondary particle that includes at least two primary particle structures, wherein the primary particle structure may include a porous inner portion and an outer portion including a radially arranged structure, and wherein the secondary particle may include at least two radial centers.

In the nickel-based active material for a lithium secondary battery, the primary particle may be positioned in a multi-center isotropic arrangement, thus forming a secondary particle.

As used herein, the term "primary particle structure" refers to an agglomerate of at least two primary particles.

Referring to FIG. 1A, a secondary particle 12 has a structure in which a plurality of primary particle structures 11 are isotropically arranged. The primary particle structures 11 include a porous inner portion 11a and an outer portion 11b including a radially arranged structure. The primary particle structures 11 may be an agglomerate formed by isotropic arrangement of at least two primary particles 11c. The primary particle structures 11 may include a nickel-based active material.

The primary particle structures 11 may be radially arranged in at least one part, and the secondary particle 12 may include at least two primary particle structures 11. The primary particle structures 11 may have a diameter (or width) i, and the secondary particle 12 may have a diameter (or width) ii.

As shown in FIG. 1A, the outer portion 11b of the primary particle structure 11 may have, for example, a structure in which plate particles, e.g., the primary particles 11c, are radially arranged. At least two such primary particles 11c may be aligned in an isotropic arrangement (or a radial arrangement) to form the primary particle structure 11, and at least two primary particle structures 11 may be aligned in an isotropic arrangement to form the secondary particle 12.

As used herein, the term "radial center" denotes, as shown in FIG. 1A, the center of the primary particle structure 11 containing the porous inner portion 11a and the outer portion 11b including a radially arranged structure.

In some embodiments, a sphericity of the most frequent particle of the nickel-based active material is in a range of about 0.960 to about 0.985, for example, about 0.970 to about 0.980. Also, a sphericity of particles in a positive electrode is in a range of about 0.960 to about 0.985, for example, about 0.970 to about 0.975. When the nickel-based active material and the positive electrode have the sphericity within these ranges, a lithium secondary battery with excellent discharge capacity characteristics and improved charge/discharge efficiency may be manufactured. A size of the primary particle structure 11 may be in a range of about 2 μm to about 5 μm, for example, about 3 μm to about 4 μm, and a size of the nickel-based active material secondary particle 12 may be in a range of about 5 μm to about 25 μm, for example, about 5 μm to about 22 μm, for example, about 7 μm to about 20 μm, for example, about 9 μm to about 15 μm. As shown in FIG. 1B, plate particles, e.g., the primary particles 11c, constituting the primary particle structure 11, may have a ratio of horizontal length iii to a vertical length iv in a range of about 1:2 to about 1:20, for example, about 1:3 to about 1:20, or, for example, about 1:5 to about 1:15. When sizes of the primary particle structure 11 and the primary particle 11c are within these ranges, use of lithium ions in the nickel-based active material may be facilitated.

FIG. 1C is a schematic view of a structure of a cross-section taken through centers of primary particle structures of a secondary particle 12 of a nickel-based active material according to an embodiment and an expanded view (A) of a plate particle, e.g., the primary particle 11c. As shown in FIG. 1C, an embodiment of the plate particle 11c has a length L, a thickness T, and a substantially hexagonal shape in a plan view.

As used herein, the term "size" refers to an average particle diameter when particles are spherical or an average length of a long axis when particles are not spherical. A size of the particles may be measured by using a particle size analyzer (PSA).

In some embodiments, a pore size of the porous inner portion 11a in the nickel-based active material may be in a range of about 150 nm to about 1 μm, for example, about 150 nm to about 800 nm, for example, about 200 nm to about 550 nm, and a pore size of the outer portion 11b may be less than about 150 nm, for example, about 100 nm or less, for example, in a range of about 20 nm to about 90 nm. As used herein, the term "a pore size" refers to an average diameter of a pore or a width of an opening of a pore when the pore is spherical or circular. When the pore is non-spherical or non-circular, such as in an elliptical form, the pore size refers to an average length of a long axis of the opening of the pore.

In the primary particle structure 11, a porosity of the porous inner portion 11a may be in a range of about 5% to about 15%, for example, about 5% to about 10%, and a porosity of the outer portion 11b may be in a range of about 1% to about 5%, for example about 1% to about 3%. When the pore size and porosity of the primary particle structure 11 is within these ranges, a nickel-based active material having improved capacity characteristics may be obtained.

In some embodiments, a porosity of the outer portion 11b of the primary particle structure 11 may be controlled to be smaller than that of the inner portion 11a. The pore size and porosity of the inner portion 11a may be irregular and greater than those of outer portion 11b. When the porosity of the inner portion 11a and the outer portion 11b of the primary particle structure 11 is within these ranges as described above, a degree of tightness in the outer portion 11b is higher than that of the inner portion 11a, which may result in effective reduction or suppression of a side reaction with an electrolyte solution.

In the inner portion 11a of the primary particle structure 11, a closed pore may be present, and a closed and/or open pore may be present in the outer portion 11b. It may be difficult to contain electrolyte or the like in a closed pore, whereas it may be possible to contain electrolyte or the like inside an open pore of the primary particle structure 11. In addition, the primary particle structure 11 may have irregular porous pore (e.g., an irregular porous structure) in the inner portion 11a. The inner portion 11a including the irregular porous structure may include plate particles as well as the outer portion 11b, and plate particles in the inner portion 11a may be irregularly aligned, unlike the outer portion 11b, which may be radially aligned.

As used herein, the term "irregular porous pore" and "irregular porous structure" refer to a pore (or pore structure) that may have irregular pore sizes and shapes and do not have uniformity. Unlike the outer portion 11b, the inner portion 11a including the irregular porous pore (e.g., the irregular porous structure) may include amorphous particles. Unlike the outer portion 11b, the amorphous particles are arranged without regularity.

When the nickel-based active material according to an embodiment has a structure described above, capacity characteristics of the nickel-based active material may be stable as compared to those of a nickel-based active material having substantially the same composition except without the features described herein. Also, when the number of radial centers is at least two, migration distances of lithium ions from a surface to the center of the secondary particles decrease (e.g., absolutely decrease), and thus availability of lithium ions may increase.

Figure 7:
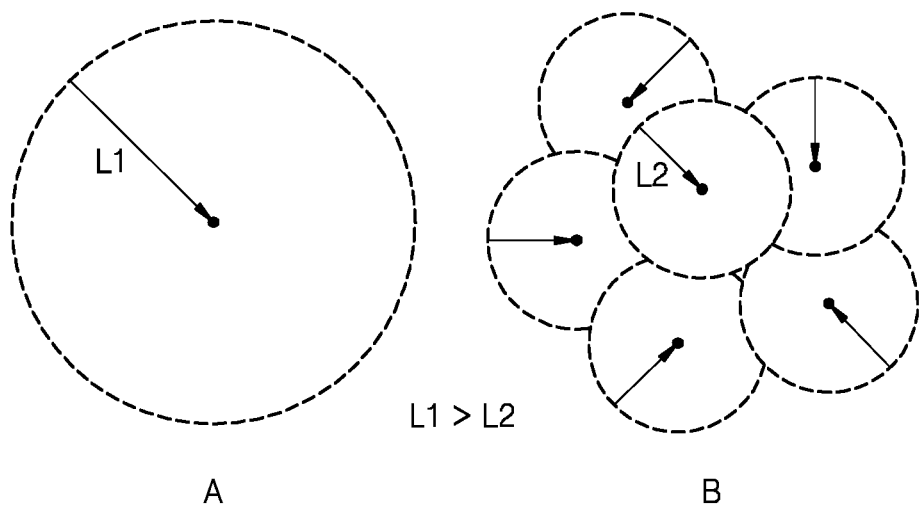
FIG. 7 is a schematic view that illustrates a comparison of migration distances of lithium ions of a nickel-based active material B according to an embodiment with migration distances of lithium ions of another nickel-based active material A.

FIG. 7 is a schematic view that illustrates lithium migration distances of lithium ions of a nickel-based active material B according to an embodiment and a general nickel-based active material A (for example, a nickel-based active material of Comparative Example 1). Referring to FIG. 7, a lithium ion migration distance L2 from a surface portion to the center of the nickel-based active material B according to an embodiment is shorter than a lithium ion migration distance L1 from a surface portion to the center of the general nickel-based active material A. Therefore, when an availability of lithium increases, a capacity of the nickel-based active material according to an embodiment may improve even when an amount of nickel is not increased.

In the nickel-based active material according to an embodiment, pores exist in the nickel-based active material, and thus cracks of particles caused by the volume change that occurs during a charge/discharge process may be prevented (or a likelihood, degree, or amount of such cracks may be reduced), which may prevent or reduce an increase of resistance. In this regard, long lifespan characteristics of a lithium secondary battery including the nickel-based active material may improve.

A multicenter radial arrangement may have about 10% to about 50%, for example, about 20% to about 40%, of an isotropic arrangement area on a cross-section that passes through a center of a secondary particle of the most frequent particle (e.g., the most abundant particle). Particles other than those in the isotropic arrangement area are aligned in an anisotropic arrangement. Particles in a general radial arrangement exist in the anisotropic arrangement area. As used herein, the term "the most frequent particle" denotes a group of particle shapes that is the most abundant in the nickel-based active material.

A laser diffraction/scatter type particle size distribution measuring device (SALD-2100, manufactured by Shimadzu Corporation) may be used to measure the particle size distribution. Then, the volume average particle diameter, each of the maximal volume frequencies, D10, D50, D90, D99, and the most frequent particle size are calculated from the measured particle size distribution. The most frequent particle size is a so-called mode diameter, which is the most frequent particle size in the particle size distribution, i.e., a particle size of particles that are the highest amount.

As used herein, the term "plate particle" refers to a particle having a thickness that is smaller than a length of a longer axis (in a plane direction). Here, the length of the longer axis refers to an upper length (e.g., a maximum length) of the widest plane of the plate particle.

The plate particle may refer to a structure in which a length (or thickness) t in one axial direction (e.g., a thickness direction) is shorter than a length of a longer axis a in a direction (e.g., a plane direction) different from the one axial direction.

Figure 1D:
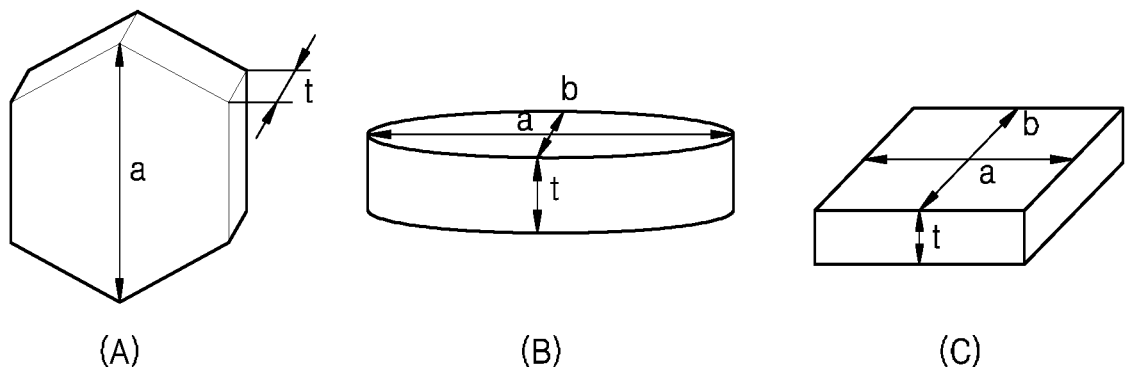
FIG. 1D is a schematic view of shapes of embodiments of a plate particle.

FIG. 1D is a schematic view of shapes of embodiments of a plate particle according to an embodiment.

Referring to FIG. 1D, the plate particle may have a polygonal nanoplate shape such as, for example, a hexagon (A), a nanodisc shape (B), and a rectangular parallelepiped shape (C).

In FIG. 1D, a thickness t of the plate particle is smaller than lengths a and b in a plan view of the plate particle. Here, the length a in a plane direction (or plan view) may be longer than or equal to the length b in a plane direction (or plan view). Regarding a plate particle, a direction in which the thickness t is defined is referred to as "a thickness direction", and a direction in which the length a or b is defined is referred to as "a plane direction".

Figure 1E:
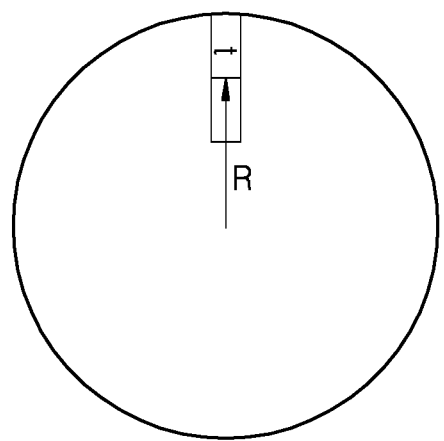
FIG. 1E is a view that illustrates a definition of a radial-type (or kind) of arrangement of a secondary particle of the nickel-based active material according to an embodiment.

The term "radial" used herein refers to an arrangement as shown in FIG. 1E in which the direction of the thickness t is aligned to be perpendicular (e.g., substantially perpendicular) to or aligned to be 85° to 95° a with respect to direction R heading to the center of the secondary particle. For example, as shown in FIG. 1E, plate particles may be radially arranged to have the plane direction aligned along the direction R such that the thickness t may be perpendicular (e.g., substantially perpendicular) to the direction R, one selected from the lengths a and b is substantially parallel to the direction R, and the other of the lengths a and b is perpendicular or substantially perpendicular to the plane in which R is arranged.

Definitions of the terms "inner portion" and "outer portion" of an active material, as used herein, will now be described in more detail.

The term "outer portion," as used herein, refers to an area occupying 30% to 50% (for example, 40%) of a length from an outer surface with respect to a total distance between the center and a surface of the nickel-based active material, or an area within 2 μm from the outmost periphery (e.g., the outer surface) of the nickel-based active material. The term "inner portion," as used herein, refers to an area occupying 50% to 70% (for example, 60%) of a length from the center with respect to a total distance between the center and a surface of the nickel-based active material, or an area outside an area within 2 μm from the outmost periphery (e.g., the outer surface) of the nickel-based active material.

As used herein, the term "isotropic arrangement" refers to an arrangement of particles in which a property of the particles does not change even when a direction of observation of matter formed of the particles changes. A direction of the arrangement used herein may not be known (e.g., may not be set), and a "multicenter" reduces a distance for lithium ion migration from a surface of a particle to the center thereof as the particle has at least two centers. With the distance thus reduced, resistance decreases accordingly, and thus the term "multicenter" used herein refers to a structure effective in terms of charge/discharge efficiency and a long lifespan.

An average thickness of the plate particles constituting the outer portion is in a range of about 100 nm to about 250 nm, or, for example, about 100 nm to about 200 nm, and an average length of a long axis of the plate particles is in a range of about 250 nm to about 1100 nm, or, for example, about 300 nm to about 1000 nm. Here, the average length of the long axis of the plate particle is about 2 to 10 times the average thickness. When the average length, the average thickness, and the ratio of the average thickness to the average length of the plate particle are satisfied within the ranges above, the size of the plate particles is small, and the primary particles are arranged radially in the outer portion of the secondary particle of the nickel-based active material, relatively many lithium diffusion paths between grain boundaries may be exposed on the surface of the secondary particle of the nickel-based active material, and many crystal surfaces capable of transferring lithium to the outer portion of the secondary particle of the nickel-based active material may be exposed.

The nickel-based active material may include an active material represented by Formula 1:

$$Li_a(Ni_{1-x-y-z}Co_xMn_yM_z)O_2 \qquad \text{Formula 1}$$

In Formula 1, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); and x, y, and z satisfy the following relations: $0.955 \leq a \leq 1.3$, $x \leq (1-x-y-z)$, $y \leq (1-x-y-z)$, $0 < x < 1$, $0 \leq y < 1$, $0 \leq z < 1$, and $0 < (1-x-y-z) < 1$. In the nickel-based active material of Formula 1, the amount of nickel in the nickel-based active material may be in a range of about 30 mol % to about 95 mol % based on a total amount of transition metals including nickel, cobalt, and manganese. The amount of nickel may be greater than an amount of cobalt, and an amount of nickel may be greater than an amount of manganese. In Formula 1, a, x, y, and z satisfy the following relations: $0.95 \leq a \leq 1.3$, for example, $1.0 \leq a \leq 1.1$, $0 < x \leq \frac{1}{3}$, for example, $0.1 \leq a \leq \frac{1}{3}$, $0 \leq y \leq 0.5$, for example, $0.05 \leq y \leq 0.3$, $0 \leq z \leq 0.05$, and $\frac{1}{3} \leq (1-x-y-z) \leq 0.95$. In an embodiment, in Formula 1, a, x, y, and z satisfy the following relations: $0.955 \leq a \leq 1.3$, for example, $1.0 \leq a \leq 1.1$; $0 < x \leq \frac{1}{3}$, for example, $0.1 \leq x \leq \frac{1}{3}$; $0 \leq y \leq 0.5$, for example, $0.05 \leq y \leq 0.3$; $0 \leq z \leq 0.05$; and $\frac{1}{3} \leq (1-x-y-z) \leq 0.95$.

In one embodiment, z in Formula 1 is 0.

In some embodiments, when z satisfies $0 < z \leq 0.05$ in Formula 1, M may be aluminum.

The amount of Ni in the nickel-based active material may be greater than that of each of other transition metals, based on 1 mole of total transition metals. When the nickel-based active material having such a large amount of Ni is used for a positive electrode to be included in a lithium secondary battery, the lithium secondary battery may have high lithium diffusion degree, good conductivity, and high capacity at substantially the same voltage. However, due to cracks generated therein, lifespan of the lithium secondary battery may be degraded.

The nickel-based active material may include $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, and/or $LiNi_{0.85}Co_{0.1}Al_{0.0.05}O_2$.

The method of preparing a nickel-based active material according to an embodiment may include a primary heat-treatment of a lithium precursor and metal hydroxide and a secondary heat-treatment.

The primary heat-treatment may include mixing a lithium precursor with a metal hydroxide at a stoichiometric or constant molar ratio, and then, heat-treatment (e.g., low-temperature heat-treatment) is performed on the mixture at a temperature in a range of about 600° C. to about 850° C.

The metal hydroxide may be a compound represented by Formula 2:

$$(Ni_{1-x-y-z}Co_xMn_yM_z)(OH)_2 \qquad \text{Formula 2}$$

In Formula 2, M may be an element selected from the group consisting of B, Mg, Ca, Sr, Ba, Ti, V, Cr, Fe, Cu, Zr, and Al, and x, y, and z satisfy the following relations: $x \leq (1-x-y-z)$, $y \leq (1-x-y-z)$, $0 < x < 1$, $0 \leq y < 1$, $0 \leq z < 1$, and $0 < (1-x-y-z) < 1$.

In Formula 2, x, y, and z satisfy $0 < x \leq \frac{1}{3}$, $0 \leq y \leq 0.5$, $0 \leq z \leq 0.05$, and $\frac{1}{3} \leq (1-x-y-z) \leq 0.95$.

In Formula 2, x, y, and z satisfy $0.55 \leq (1-x-y-z) \leq 0.95$.

In Formula 2, the metal hydroxide may include, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, and/or $Ni_{0.8}Co_{0.1}Mn_{0.1}(OH)_2$.

The lithium precursor may include, for example, lithium hydroxide, lithium fluoride, lithium carbonate, or a mixture thereof. A ratio at which the lithium precursor and the metal hydroxide are mixed may be stoichiometrically adjusted to prepare the metal hydroxide of Formula 2.

Here, the mixing may be dry mixing, or may be performed using a mixer or the like.

The drying mixing may be performed according to a milling method. Here, in consideration of milling conditions, the drying mixing may be performed in a way such that metal hydroxide used as a starting material barely undergoes deformation such as pulverization. In this regard, a process of controlling the size of the lithium precursor, which is to be mixed with the metal hydroxide, in advance may be performed. In an embodiment, the size (e.g., particle size) of the lithium precursor may be in a range of about 5 μm to about 15 μm, for example, may be about 10 μm. When the lithium precursor having the size (e.g., particle) within the range above is subjected to a milling process with the metal hydroxide, a desired nickel-based active material may be obtained In one embodiment, the size (e.g., particle size) of the metal hydroxide may be almost identical to that of the nickel-based active material. In an embodiment, the metal hydroxide which is a composite metal hydroxide may have, for example, an average thickness in a range of about 100 nm to about 250 nm, an average length in a range of about 250 nm to about 1,100 nm, an internal pore size in a range of about 150 nm to about 550 nm, and an external pore size in a range of about 50 nm to about 148 nm.

The primary heat-treatment may be performed in an oxidative gas atmosphere. In the oxidative gas atmosphere, oxidative gas, such as, for example oxygen or air, may be used.

The primary heat-treatment may be suitably or appropriately performed in a range of densification temperature or lower as the reaction of the lithium precursor and the metal hydroxide proceeds. Here, the densification temperature refers to a temperature at which suitable or sufficient crystallization may be performed to realize the upper (e.g., maximum) charging capacity of an active material.

The primary heat-treatment may be performed, for example, at a temperature in a range of about 600° C. to about 850° C., or about 650° C. to about 800° C. Here, the time for the primary heat-treatment may vary according to the temperature at which the primary heat-treatment is performed. For example, the primary heat-treatment may be performed for about 3 hours to about 10 hours.

The secondary heat-treatment may include a process, in which the secondary particles of the nickel-based active material may be subjected to a heat-treatment in an oxidative gas atmosphere where an exhaust of the secondary particles is suppressed or reduced.

When the exhaust of the secondary particles is suppressed or reduced in manufacturing, the generation of the surface resistive layer may be suppressed or reduced as much as possible or practical by maintaining the atmosphere inside a reactor and particle densification may be performed.

The secondary heat-treatment may be performed at a temperature in a range of about 700° C. to about 950° C. The time for the secondary heat-treatment may vary according to the temperature at which the secondary heat-treatment is performed. For example, the secondary heat-treatment may be performed for about 3 hours to about 10 hours. A method of preparing a metal hydroxide that is used in the preparation of the nickel-based active material may be described as follows.

Such a method of preparing the metal hydroxide is not particularly limited, but for example, may be performed according to a co-precipitation method and/or a solid phase method.

Hereinafter, as an example for the metal hydroxide, the compound of Formula 2 is subjected to a co-precipitation method to describe an embodiment of the method of preparing the metal hydroxide.

A raw material for the nickel-based active material, such as a Ni precursor, a Co precursor, a Mn precursor, and a metal M precursor, is mixed with a solvent to obtain a precursor mixture.

Here, an amount of the Ni precursor, the Co precursor, the Mn precursor, and the metal M precursor may be stoichiometrically adjusted to prepare the compound of Formula 2.

Examples of the solvent include water, ethanol, propanol, and butanol. Also, an amount of the solvent may be in a range of about 100 parts to about 2000 parts by weight based on 100 parts by weight of the total weight of the Ni precursor, the Co precursor, the Mn precursor, and the metal M precursor.

A precipitating agent and a pH regulator may be added to the precursor mixture to control pH of the resulting mixture, and a co-precipitation method is performed thereon to obtain precipitations (e.g., precipitates). Here, pH of the resulting mixture is adjusted to pH 11 to pH 13. The precipitations (e.g., precipitates) obtained therefrom are subjected to filtration and heat treatment. Here, the heat treatment is performed at a temperature in a range of about 20° C. to about 160° C. to dry the filter cakes (e.g., filtrates obtained from filtration and heat treatment of the precipitates).

The precipitating agent may serve to control a reaction (formation) rate of the precipitations in the co-precipitation reaction, and examples thereof include ammonium hydroxide ($NH_4OH$) and citric acid. Here, an amount of the precipitating agent may be used at any suitable amount, such as those generally used in the art.

The pH regulator may serve to control pH of a reaction mixture to be in a range of pH 11 to pH 13, and examples thereof include ammonium hydroxide ($NH_4OH$), sodium hydroxide (NaOH), sodium carbonate ($Na_2CO_3$), and sodium oxalate ($Na_2C_2O_4$)

Examples of the Ni precursor include nickel sulfate, nickel chloride, and nickel nitrate. Examples of the Co precursor include cobalt sulfate, cobalt chloride, and cobalt nitrate. Examples of the Mn precursor include manganese sulfate, manganese nitrate, and manganese chloride. Examples of the metal M precursor include metal carbonate, metal sulfate, metal nitrate, and metal chloride.

Hereinafter, a method of preparing a lithium secondary battery including a positive electrode including the nickel-based active material according to an embodiment, a negative electrode, a non-aqueous electrolyte containing a lithium salt, and a separator will be described.

A positive electrode and a negative electrode are prepared by applying a composition for forming a positive active material layer and a composition for forming a negative active material layer on a current collector, respectively, and then, by drying the current collector.

The composition for forming the positive active material layer may be prepared by mixing a positive active material, a conductive agent, a binder, and a solvent. Here, a positive active material according to an embodiment may be used as the positive active material.

The binder, which is a component that assists in binding between a current collector with an active material, a conductive agent, or the like, may be added in an amount in a range of about 1 part to about 50 parts by weight based on 100 parts by weight of the total weight of the positive active material. Non-limiting examples of the binder are polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, and various suitable copolymers.

As the conductive agent, any suitable material may be used as long as it has electrical conductivity without causing an unsuitable, undesirable, and/or unwanted chemical change in a corresponding battery including the conductive agent. Examples of the conductive agent include graphite, such as, for example, natural graphite or artificial graphite; a carbonaceous material, such as, for example, carbon black, acetylene black, ketjen black, channel black, furnace black, lamp black, or summer black; conductive fiber, such as, for example, carbon fiber or metal fiber; fluorocarbon; metal powder, such as, for example, aluminum powder or nickel powder; conductive whisker, such as, for example, zinc oxide or potassium titanate; and a conductive material, such as, for example, a polyphenylene derivative.

A non-limiting example of the solvent includes N-methylpyrrolidone.

The binder, conductive agent, and solvent may be used in an amount that is generally used in the art.

For use as a positive current collector, a material is not particularly limited as long as it has a thickness in a range of about 3 μm to about 500 μm and has high conductivity without causing an unsuitable, undesirable, and/or unwanted chemical change in a corresponding battery including the positive current collector. Examples of the positive current collector include stainless steel, aluminum, nickel, titanium, heat treated carbon, and aluminum or stainless steel that is surface treated with carbon, nickel, titanium, or silver. The current collector may have a fine uneven structure at its surface to increase a binding force with respect to the positive active material. The current collector may have various suitable shapes, such as, for example, film, sheet, foil, net, porous, foam, or non-woven shape.

In a separate manner, the composition for forming the negative active material may be prepared by mixing a negative active material, the binder, the conductive agent, and the solvent. As the negative active material, a material that allows lithium ions to intercalate thereinto or deintercalate therefrom may be used. Non-limiting examples of the negative active material include graphite, a carbonaceous material, such as carbon, lithium metal, an alloy thereof, and a silicon oxide-based material.

An amount of the binder may be in a range of about 1 part to about 50 parts by weight based on 100 parts by weight of the total weights of the negative active material. Non-limiting examples of the binder may be substantially the same as those described above in connection with the positive electrode.

An amount of the conductive agent may be in a range of about 1 part to about 5 parts by weight, based on 100 parts by weight of the total weights of the negative active material. When the amount of the conductive agent is within the range above, a finally obtained negative electrode may have excellent conductivity.

An amount of the solvent may be in a range of about 100 to about 3000 parts by weight, based on 100 parts by weight of the total weights of the negative active material. When the amount of the solvent is within the range above, the negative active material layer may be easily formed.

The conductive agent and the solvent may be substantially the same as those described above in connection with the positive electrode.

The negative current collector may have a thickness in a range of about 3 μm to about 500 μm. As the negative current collector, any suitable material may be used as long as it has electrical conductivity without causing an unsuitable, undesirable, and/or unwanted chemical change in a corresponding battery including the negative current collector. Examples of the negative current collector include copper, stainless steel, aluminum, nickel, titanium, heat treated carbon, and copper or stainless steel that is surface treated with carbon, nickel, titanium, silver, and an aluminum-cadmium alloy. In addition, like the positive current collector, the negative current collector may have a fine uneven structure at its surface to increase a binding force thereof with respect to a negative active material. For example, the negative current collector may have various suitable shapes, such as, for example, film, sheet, foil, net, porous, foam, or non-woven shape.

A separator may be disposed between the positive electrode and the negative electrode that are manufactured as described above.

The separator may have a pore diameter in a range of about 0.01 μm to about 10 μm and a thickness in a range of about 5 μm to about 300 μm. Examples of the separator include an olefin-based polymer, such as, for example, polypropylene or polyethylene; or a sheet or non-fabric form formed of glass fiber. When a solid electrolyte, such as, for example, a polymer, is used as the electrolyte, the solid electrolyte may also act as a separator.

The non-aqueous electrolyte containing a lithium salt may include a non-aqueous electrolyte and a lithium salt. Examples of the non-aqueous electrolyte include an organic solid electrolyte and an inorganic solid electrolyte.

Non-limiting examples of the non-aqueous electrolyte include an aprotic organic solvent, such as, for example, N-methyl-2-pyrrolidinone, propylene carbonate, ethylene carbonate, butylene carbonate, dimethyl carbonate, diethyl carbonate, gammabutyrolactone, 1,2-dimethoxy ethane, 2-methyl tetrahydrofuran, dimethylsulfoxide, 1,3-dioxolane, formamide, N,N-dimethylformamide, acetonitrile, nitromethane, methyl formate, methyl acetate, triester phosphate, trimethoxy methane, sulfolane, methyl sulfolane, 1,3-dimethyl-2-imidazolidinone, a tetrahydrofuran derivative, ether, methyl propionate, and ethyl propionate.

Non-limiting examples of the organic solid electrolyte include a polyethylene derivative, a polyethylene oxide derivative, a polypropylene oxide derivative, polyvinyl alcohol, and polyvinylidene fluoride.

Non-limiting examples of the inorganic solid electrolyte include $Li_3N$, $LiI$, $Li_5NI_2$, $Li_3N-LiI-LiOH$, $Li_2SiS_3$, $Li_4SiO_4$, $Li_4SiO_4-LiI-LiOH$, or $Li_3PO_4-Li_2S-SiS_2$.

The lithium salt may be any one of various suitable materials that are easily dissolved in the non-aqueous electrolyte, and non-limiting examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $(FSO_2)_2NLi$, lithium chloroborate, lithium lower aliphatic carboxylate, and lithium tetrakisphenyl borate.

Figure 2:
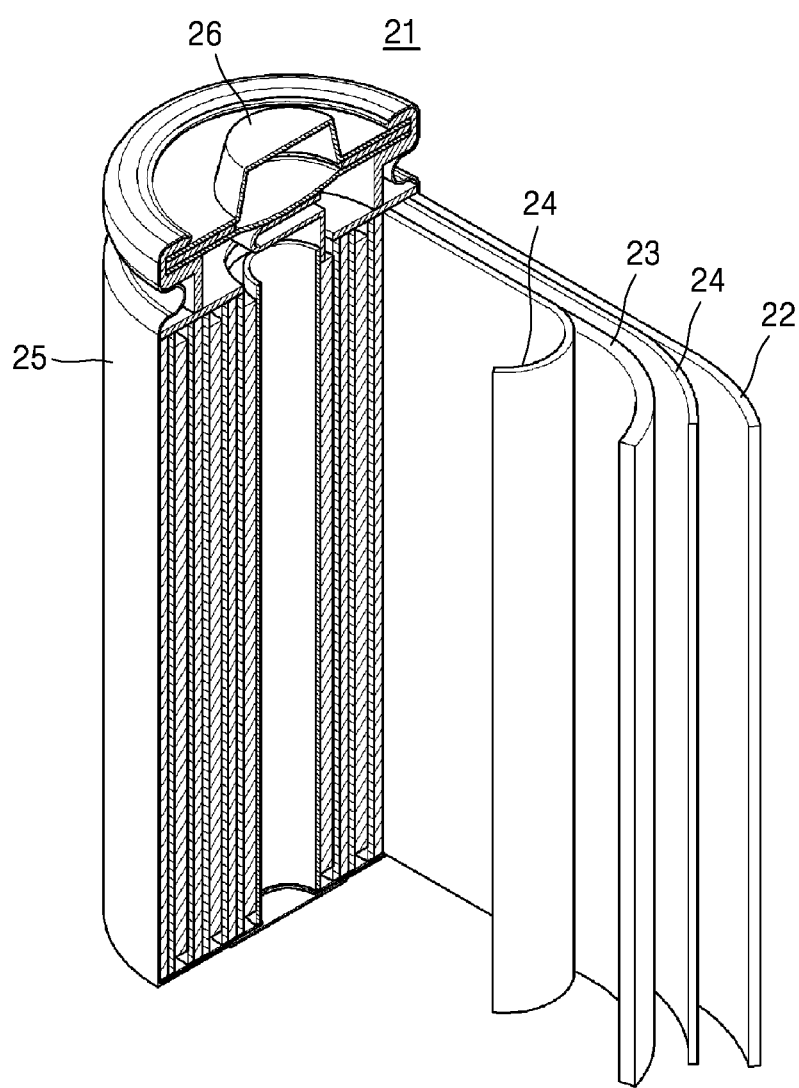
FIG. 2 is a schematic view of a lithium secondary battery according to an embodiment.

FIG. 2 is a schematic view of a structure of a lithium secondary battery according to an embodiment.

Referring to FIG. 2, the lithium secondary battery 21 includes a positive electrode 23, a negative electrode 22, and a separator 24. The positive electrode 23, the negative electrode 22, and the separator 24 may be wound or folded, and then sealed in a battery case 25. Then, the battery case 25 may be filled with an organic electrolyte and sealed with a cap assembly 26, thereby completing the manufacture of the lithium secondary battery 21. The battery case 25 may be a cylindrical type (or kind), a rectangular type (or kind), or a thin-film type (or kind). For example, the lithium secondary battery 21 may be a thin-film type (or kind) of battery. For example, the lithium secondary battery 21 may be a lithium ion battery.

The separator 24 may be disposed between the positive electrode 23 and the negative electrode 22 to form a battery assembly. The battery assembly may be stacked in a bi-cell structure and impregnated with the organic electrolyte. The resultant assembly may be put into a pouch and hermetically sealed, thereby completing the manufacture of a lithium ion polymer battery. In addition, a plurality of battery assemblies may be stacked to form a battery pack, which may be used in any suitable device that requires high capacity and high output, for example, in a laptop computer, a smart phone, or an electric vehicle.

In addition, the lithium secondary battery may have excellent storage stability at a high temperature, improved lifetime characteristics, and high rate characteristics, and thus may be used in an electric vehicle (EV), for example, in a hybrid vehicle such as a plug-in hybrid electric vehicle (PHEV).

The following Examples and Comparative Examples are provided in order to further describe the subject matter of the present disclosure, but it will be understood that the Examples and Comparative Examples are not to be construed as limiting the scope of the embodiments, nor are the Comparative Examples to be construed as being outside the scope of the embodiments.

Example 1

A radial and porous metal hydroxide ($Ni_{0.6}Co_{0.2}Mn_{0.2}(OH)_2$) and a lithium hydroxide (LiOH) were dry-mixed at a molar ratio of 1:1 to prepare a mixture. The mixture was heat-treated in an oxygen atmosphere at about 700° C. for 6 hours to prepare a nickel-based active material (LiNi$_{0.6}$Co$_{0.2}$Mn$_{0.2}$O$_2$). The nickel-based active material thus prepared had a porous structure in an inner portion and a radially arranged structure in an outer portion. The nickel-based active material was heat-treated in the air at about 800° C. for 6 hours to prepare a nickel-based active material secondary particle (LiNi$_{0.6}$Co$_{0.2}$Mn$_{0.2}$O$_2$).

The metal hydroxide (Ni$_{0.6}$Co$_{0.2}$Mn$_{0.2}$(OH)$_2$) metal precursor was prepared as follows.

A nickel sulfate (NiSO$_4$.6H$_2$O), a cobalt sulfate (CoSO$_4$.7H$_2$O), and a manganese sulfate (MnSO$_4$.H$_2$O), as metal precursors for forming a nickel-based active material, were dissolved at a molar ratio of 6:2:2 in a solvent, that is, distilled water, such that a total concentration of the metal raw materials was 2 M, and thus a mixed metal source solution was prepared. In consideration of formation of a complex compound, 29 wt % of ammonia water (NH$_4$OH) and 6M of sodium hydroxide (NaOH), as a precipitating agent, were used. The mixed metal source solution and ammonia water were added to a reactor at a speed of 5.0 L/hr and 0.5 L/hr, respectively, and sodium hydroxide was then added thereto to adjust pH to about 11 to 12. The stirring power was controlled to about 2.5 kW/m$^3$ to about 6.0 kW/m$^3$. The reaction was continued until seeds having a size of about 40% to about 60% of a size of final positive active material particles were grown. Subsequently, the adding speeds of the mixed metal source solution and the ammonia water were changed to about 6.5 L/hr and 1.5 L/hr, respectively to grow the seeds for the particles having an average particle diameter (D50) of about 9 μm to about 11 μm, while sodium hydroxide was added to adjust pH to about 10 to 11, and the stirring power was controlled to about 2.0 kW/m$^3$ to 2.5 kW/m$^3$.

Subsequently, the adding speeds of the mixed metal source solution and the ammonia water were changed to about 7.5 L/hr and 2.0 L/hr, while sodium hydroxide was added to adjust pH to about 10 to 10.5, and the stirring power was controlled to about 1.5 kW/m$^3$ to 2.0 kW/m$^3$. The reaction was continued until the particles having an average particle diameter (D50) of about 10 μm to 12 μm were formed. That is, a precursor was obtained by stepwise decreasing the stirring power and pH and stepwise increasing the source supply speed.

A slurry solution in the reactor was filtered and washed with high-purity distilled water, and then, dried in a hot-air oven at 150° C. for 24 hours, thereby obtaining a metal hydroxide precursor (Ni$_{0.6}$Co$_{0.2}$Mn$_{0.2}$(OH)$_2$) powder.

Example 2

A nickel-based active material particle was obtained in substantially the same manner as in Example 1, except for doubling the reaction time so that the reaction was carried out at 50° C. for about 26 hours instead of carrying out the reaction at 50° C. for about 13 hours in the preparation of the metal hydroxide.

Comparative Example 1

A metal hydroxide (Ni$_{0.6}$Co$_{0.2}$Mn$_{0.2}$(OH)$_2$) and a lithium hydroxide (LiOH) were dry-mixed at a molar ratio of 1:1 to prepare a mixture. The mixture was heat-treated at about 800° C. for 12 hours to prepare a nickel-based active material (LiNi$_{0.6}$Co$_{0.2}$Mn$_{0.2}$O$_2$). A particle of the nickel-based active material thus prepared did not have pores in an inner portion, but amorphous primary particles in the inner portion and the outer portion had an isotropically arranged structure.

The metal hydroxide (Ni$_{0.6}$Co$_{0.2}$Mn$_{0.2}$(OH)$_2$) was prepared as follows. A nickel sulfate (NiSO$_4$.6H$_2$O), a cobalt sulfate (CoSO$_4$.7H$_2$O), and a manganese sulfate (MnSO$_4$.H$_2$O), as metal precursors for forming a nickel-based active material, were dissolved at a molar ratio of 6:2:2 in distilled water as a solvent, so that a total concentration of the metal raw materials (nickel sulfate, a cobalt sulfate, and a manganese sulfate) was 1.3 M, and thus a mixed solution was prepared. In consideration of formation of a composite compound, 29 wt % of ammonia water (NH$_4$OH) and 6 M of sodium hydroxide (NaOH), as a precipitating agent, were used.

A mixed solution of metal raw materials, ammonia water at an amount of 1 M with respect to the metal raw materials, and sodium hydroxide were each continuously added to the reactor containing diluted ammonia water. The amount of ammonia water was 1 mol based on 1 mol of the metal raw material. Next, the reaction was carried out at 50° C. for about 24 hours while the reaction mixture in the reactor was stirred.

A slurry solution in the reactor was filtered and washed with high-purity distilled water, and then, dried in a hot-air oven at 150° C. for 24 hours, thereby obtaining a metal hydroxide precursor (Ni$_{0.6}$Co$_{0.2}$Mn$_{0.2}$(OH)$_2$) powder.

Comparative Example 2

A radial composite metal hydroxide (Ni$_{0.6}$Co$_{0.2}$Mn$_{0.2}$(OH)$_2$) and a lithium hydroxide (LiOH) were dry-mixed at a molar ratio of 1:1 to prepare a mixture. The mixture was heat-treated at about 700° C. for 12 hours to prepare a nickel-based active material (LiNi$_{0.6}$Co$_{0.2}$Mn$_{0.2}$O$_2$). A particle of the nickel-based active material thus prepared did not have pores in an inner portion, but amorphous primary particles in the inner portion and the outer portion had a radially arranged structure.

The radial composite metal hydroxide (Ni$_{0.6}$Co$_{0.2}$Mn$_{0.2}$(OH)$_2$) was prepared as follows. A nickel sulfate (NiSO$_4$.6H$_2$O), a cobalt sulfate (CoSO$_4$.7H$_2$O), and a manganese sulfate (MnSO$_4$.H$_2$O), as metal precursors for forming a nickel-based active material, were dissolved at a molar ratio of 6:2:2 in distilled water as a solvent, so that a total concentration of the metal raw materials was 1.3 M, and thus a metal precursor mixture was prepared. In consideration of formation of a composite compound, ammonia water (NH$_4$OH) and sodium hydroxide (NaOH), as a precipitating agent, were used.

A mixed solution of metal raw materials, ammonia water at an amount of 1 mol as a molar ratio with respect to the metal raw materials, and sodium hydroxide were each continuously added to the reactor containing diluted ammonia water. The amount of ammonia water (ammonium hydroxide) was 1 mol based on 1 mol of the metal raw material, and the amount of sodium hydroxide was controlled by a pH controller. Next, the reaction was carried out at 50° C. for about 25 hours while the reaction mixture in the reactor was stirred, and then the introduction of the metal precursor mixture was stopped.

A slurry solution in the reactor was filtered and washed with high-purity distilled water, and then, dried in a hot-air oven at 150° C. for 24 hours, thereby obtaining a metal hydroxide precursor (Ni$_{0.6}$Co$_{0.2}$Mn$_{0.2}$(OH)$_2$) powder.

The active material prepared in Comparative Example 2 was evenly aligned from an outside to the center of the active material, and a size of the active material was large, which did not facilitate migration of lithium ions.

Manufacture Example 1: Preparation of Coin Cell

The secondary particle of the nickel-based active material (LiNi$_{0.6}$Co$_{0.2}$Mn$_{0.2}$O$_2$) of Example 1 was used as the positive active material for a coin cell as follows.

96 g of the secondary particle of the nickel-based active material (LiNi$_{0.6}$Co$_{0.2}$Mn$_{0.2}$O$_2$) of Example 1, 2 g of polyvinylidene fluoride, 15 g of N-methylpyrrolidone, as a solvent, and 2 g of carbon black, as a conductive agent, were mixed. Bubbles were removed from the mixture by using a mixer, thereby preparing a homogeneously dispersed slurry for forming a positive active material layer.

The slurry obtained therefrom was coated on an aluminum film by using a doctor blade to form a thin electrode plate. The thin electrode plate was then dried at a temperature of 120° C. for 3 hours or more, and then, pressed and vacuum-dried to form a positive electrode.

The positive electrode and lithium metal, as a counter electrode, were used to manufacture a 2032-type (or kind) of coin cell. A separator (thickness: about 16 μm) formed of a porous polyethylene (PE) film was disposed between the positive electrode and the lithium metal counter electrode. Then, an electrolyte was provided thereto, thereby completing manufacturing a 2032-type (or kind) of coin cell. As the electrolyte, a solution containing 1.15 M LiPF$_6$ dissolved in a mixed solvent of ethylene carbonate (EC), ethylmethylcarbonate (EMC), and dimethylcarbonate (DMC) at a volumetric ratio of 2:4:4 was used.

Manufacture Example 2: Preparation of Coin Cell

A coin cell was manufactured in substantially the same manner as in Manufacture Example 1, except that the secondary particle of the nickel-based active material of Example 2 was used instead of the secondary particle of the nickel-based active material of Example 1.

Manufacture Example 3: Preparation of Full Cell

A 18650 cylindrical full cell was prepared in substantially the same manner as in Manufacture Example 1, except that a negative electrode prepared in the following manner instead of the lithium metal counter electrode was used as a negative electrode.

Natural graphite, carboxymethylcellulose (CMC), and styrene butadiene rubber (SBR) were mixed to prepare a composition for forming a negative active material layer, and the composition was coated and dried on a copper current collector to prepare a negative electrode. A weight ratio of the natural graphite, CMC, and SBR was 97.5:1:1.5, and an amount of distilled water was about 50 parts by weight based on 100 parts by weight of the total weight of the natural graphite, CMC, and SBR.

Comparative Manufacture Examples 1 and 2: Preparation of Coin Cell

Coin cells were each prepared in substantially the same manner as in Manufacture Example 1, except that the nickel-based active materials prepared in Comparative Examples 1 and 2 were used, respectively, instead of the nickel-based active material prepared in Example 1.

Comparative Manufacture Examples 3 and 4: Preparation of Full Cell

Full cells were prepared in substantially the same manner as in Comparative Manufacture Examples 1 and 2, except that a negative electrode prepared in the following manner instead of the lithium metal counter electrode was used as a negative electrode.

Natural graphite, CMC, distilled water, and SBR were mixed to prepare a composition for forming a negative active material layer, and the composition was coated and dried on a copper current collector to prepare a negative electrode. A weight ratio of the natural graphite, CMC, and SBR was 97.5:1:1.5, and an amount of distilled water was about 50 parts by weight based on 100 parts by weight of the total weight of the natural graphite, CMC, and SBR.

Evaluation Example 1: Analysis Using Scanning Electron Microscope (SEM)

Secondary particles of the nickel-based active materials of Example 1 and Comparative Examples 1 and 2 were analyzed by using a scanning electron microscope (SEM). The SEM used herein was a Magellan 400 L (manufactured by FEI Company). A pretreatment was performed on a sample cross-section by milling using a CP2 (manufactured by JEOL) for 4 hours at a voltage of 6 kV and a current of 150 uA. Then, the SEM analysis was performed under the conditions of 350 V.

Figure 3A:
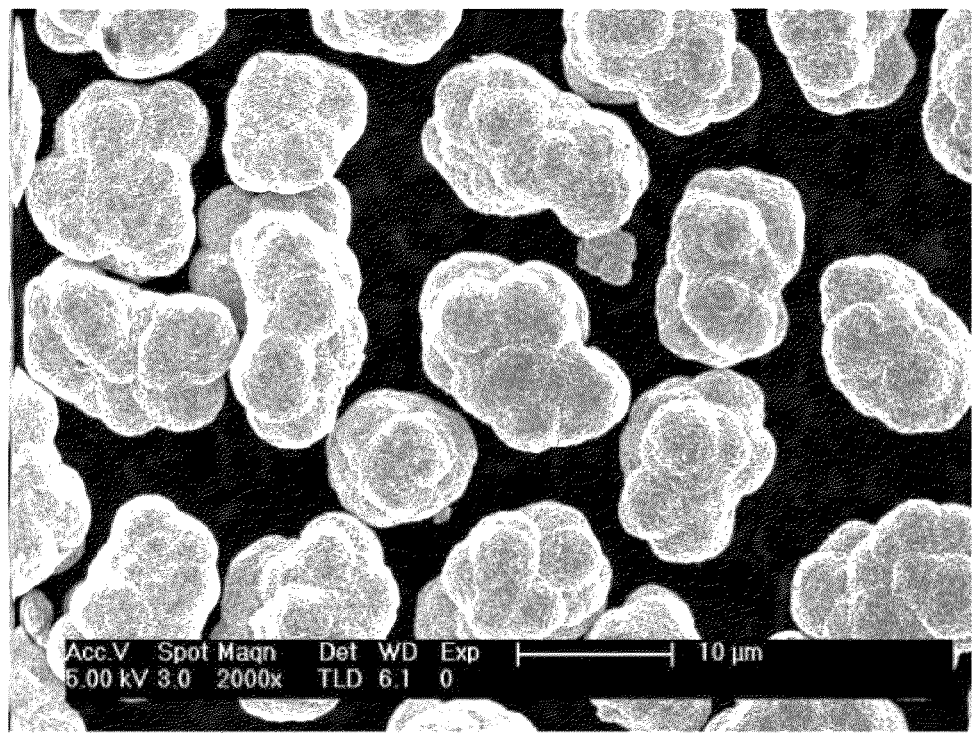
FIG. 3A is a scanning electron microscope (SEM) image of nickel-based active material prepared in Example 1.
Figure 3B:
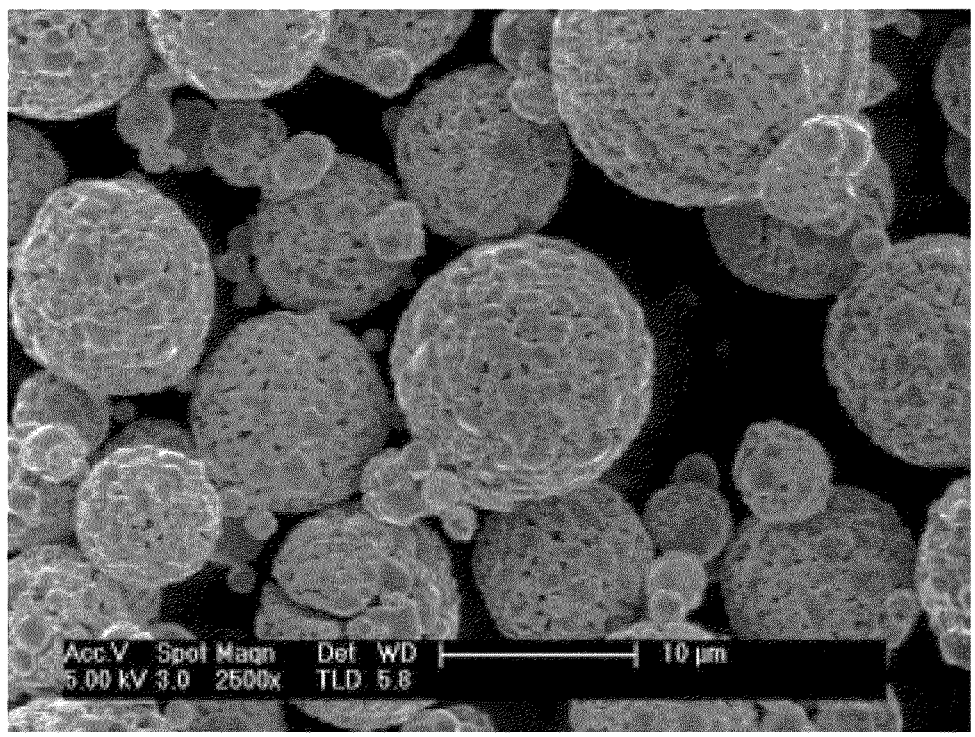
FIG. 3B is a SEM image of nickel-based active materials prepared in Comparative Example 1.
Figure 3C:
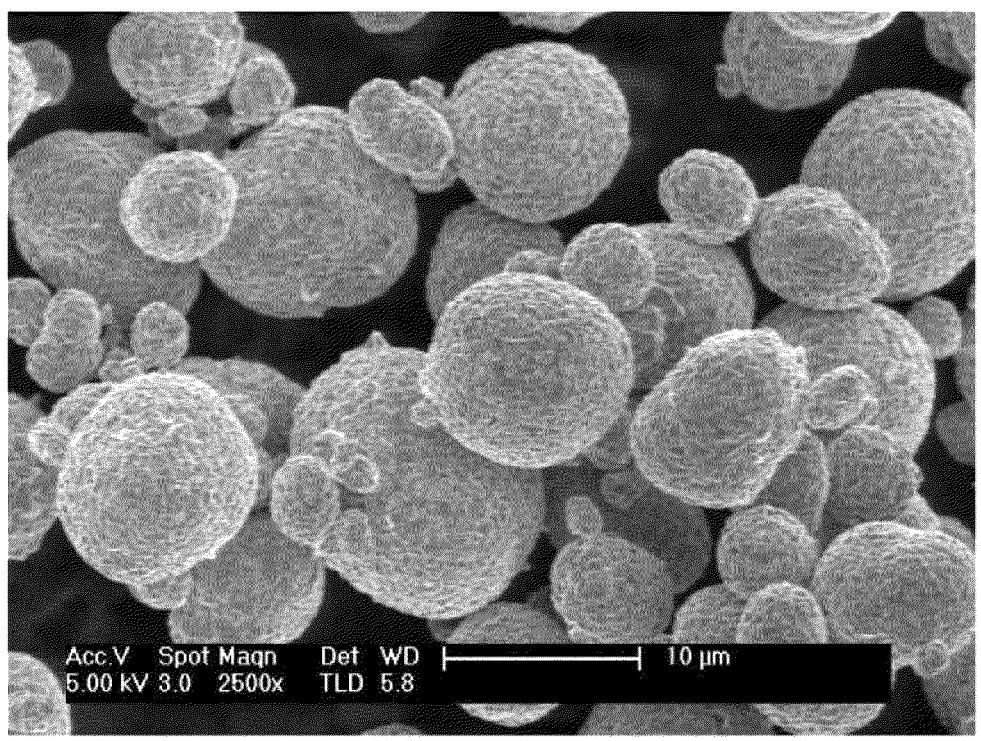
FIG. 3C is a SEM image of nickel-based active materials prepared in Comparative Example 2.

The results of analyzing the nickel-based active materials prepared in Example 1 and Comparative Examples 1 and 2 by using an SEM are shown in FIGS. 3A-3C, respectively.

Referring to FIGS. 3A-3C, the nickel-based active material secondary particles prepared in Example 1 were found to have at least two radial centers. The primary particle structures were found to have a porous inner portion and an outer portion including an radial arrangement and aligned in an isotropic arrangement, thereby forming a nickel-based active material secondary particle. In addition, it was found that the primary particles are aligned in an isotropic arrangement, thereby forming a primary particle structure. In contrast, the nickel-based active materials of Comparative Example 1 and Comparative Example 2 were found not to have two or more radial centers.

Evaluation Example 2: SEM and Sphericity

Secondary particles of the nickel-based active materials of Example 1 and Comparative Examples 1 and 2 were analyzed by using an SEM. The SEM used herein was a Magellan 400 L (manufactured by FEI Company). A pretreatment was performed on a sample cross-section by milling using a CP2 (manufactured by JEOL) for 4 hours at a voltage of 6 kV and a current of 150 uA. The results of the analysis performed on the secondary particles of the nickel-based active materials by using a SEM are shown in FIGS. 3A-3C, respectively.

Referring to FIGS. 3A-3C, it was found that particles of the nickel-based active materials of Comparative Examples 1 and 2 have a spherical shape, whereas the secondary particles of the nickel-based active material of Example 1 have a non-spherical shape, which included a structure including at least two radial centers.

Also, a sphericity of the most frequent particle in the secondary particle of the nickel-based active material of Example 1 was measured. The sphericity was measured by using an FPIA-3000 (manufactured by Sysmex Corporation, Japan). In the measurement by using FPIA-3000, samples for the measurement were each prepared by adding a surfactant to 50 to 100 ml of distilled water, and adding 10 to 20 mg of the secondary particle of the nickel-based active material of Example 1 thereto, sonicating the resultant in a sonicator for 1 minute. The sphericity is automatically obtained by the FPIA-3000 according to Equation 1.

$$\text{Sphericity} = \{2 \times (\text{area} \times \pi)^{1/2}\}/(\text{perimeter}) \quad \text{Equation 1}$$

In Equation 1, the area refers to an area of a projected particle, and the perimeter refers to a circumferential length of a circle having the same area with that of the projected particle. A value of the sphericity may be in a range of about 0 to about 1. The closer the value is 1, the more circular the particle is, and the closer the value is 0, the more linear the particle is.

TABLE 1

| Sample | Sphericity |
| --- | --- |
| Example 1 | 0.970 |
| Example 2 | 0.980 |
| Comparative Example 1 | 0.995 |
| Comparative Example 2 | 0.990 |

Referring to Table 1, sphericities of the secondary particles of the nickel-based active materials prepared in Examples 1 and 2 were smaller than those of the secondary particles of nickel-based active materials prepared in Comparative Examples 1 and 2.

Evaluation Example 3: Measurement of Porosity and Pore Size in Inner Portion of Active Material The secondary particles of the nickel-based active material of Example 1 were analyzed by using an SEM. The SEM used herein was a Magellan 400 L (manufactured by FEI Company). A pretreatment was performed on a sample cross-section by milling using a CP2 (manufactured by JEOL) for 4 hours at a voltage of 6 kV and a current of 150 uA. An SEM analysis of a surface and a cross-section of the nickel-based active material secondary particle was performed. Referring to the results, primary particles of the nickel-based active material were plate particles most of which have a plate shape aligned in a radial arrangement, but some primary particles of the nickel-based active material are arranged in a non-radial arrangement. Here, an amount of the non-radial plate particles was about 3 wt % based on the total weight of the radial plate particle and the non-radial plate particles. Average lengths, average thicknesses, and average ratios (average length/average thickness) of the plate particles were calculated, and the results are shown in Table 2.

TABLE 2

| | Surface | | Cross-section |
| --- | --- | --- | --- |
| Average length (nm) | 290 | Average length (nm) | 360 |
| Average thickness (nm) | 130 | Average thickness (nm) | 150 |
| Average ratio | 2.3 | Average ratio | 2.9 |

In Table 2, the plate particles denote particles constituting a radially arranged structure in the outer portion of the active material.

Evaluation Example 4: Charging/Discharging Characteristics

1) Manufacture Examples 1 and 2 and Comparative Manufacture Examples 1 and 2

The coin cells of Manufacture Examples 1 and 2 and Comparative Manufacture Examples 1 and 2 were charged and discharged once at 0.1 C to perform a formation process. Then, the coin cells were charged and discharged once at 0.2 C to identify initial charging and discharging characteristics. As the coin cells were repeatedly charged and discharged at 1 C for 50 times at 45° C., the charging and discharging characteristics were observed. During charging, the charging began in a constant current (CC) mode, and then, the mode was changed into a constant voltage (CV) mode which is set to cut off at 0.05 C and 4.3 V; and during discharging, the cut-off was set at 3.0 V in a CC mode.

The charging/discharging characteristics are shown in Table 3. Also, voltage changes according to capacities of the coin cells of Manufacture Example 1 and Comparative Manufacture Examples 1 and 2 are shown in FIG. 4.

TABLE 3

| Sample | Charging/discharging efficiency (%) |
| --- | --- |
| Manufacture Example 1 | 95.1 |
| Manufacture Example 2 | 93.5 |
| Comparative Manufacture Example 1 | 90.9 |
| Comparative Manufacture Example 2 | 93.3 |

Figure 4:
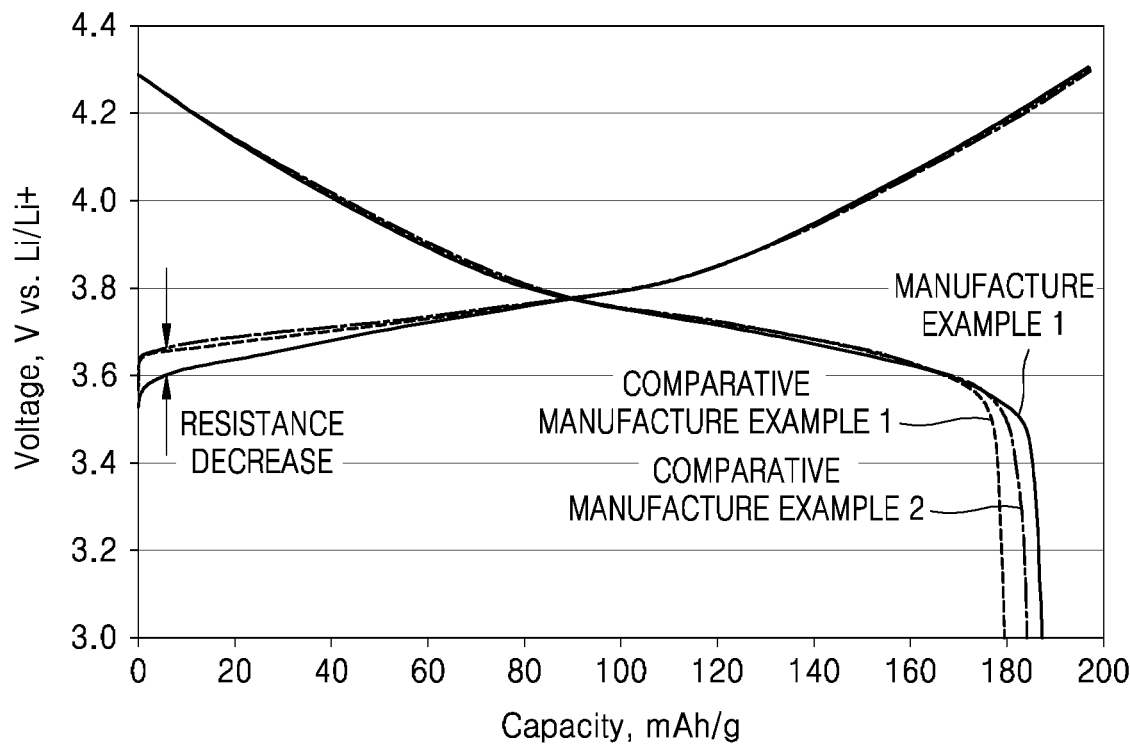
FIG. 4 is a graph that shows a voltage change according to an initial capacity in each of coin cells prepared in Manufacture Example 1 and Comparative Manufacture Examples 1 and 2.

Referring to Table 3 and FIG. 4, lithium diffusion resistance of the coin cells prepared in Manufacture Examples 1 and 2 significantly decreased within the initial charging voltage range, and thus charging/discharging efficiencies of the lithium secondary batteries at substantially the same charge capacity (using an active material having the same transition metal composition) improved, compared to those of Comparative Manufacture Examples 1 and 2.

2) Manufacture Example 3 and Comparative Manufacture Examples 3 and 4

Charging/discharging characteristics of the full cells prepared in Manufacture Example 3 and Comparative Manufacture Examples 3 and 4 were evaluated in the same manner as in the method used to evaluate charging/discharging characteristics of the coin cells prepared in Manufacture Examples 1 and 2 and Comparative Manufacture Examples 1 and 2.

Figure 5:
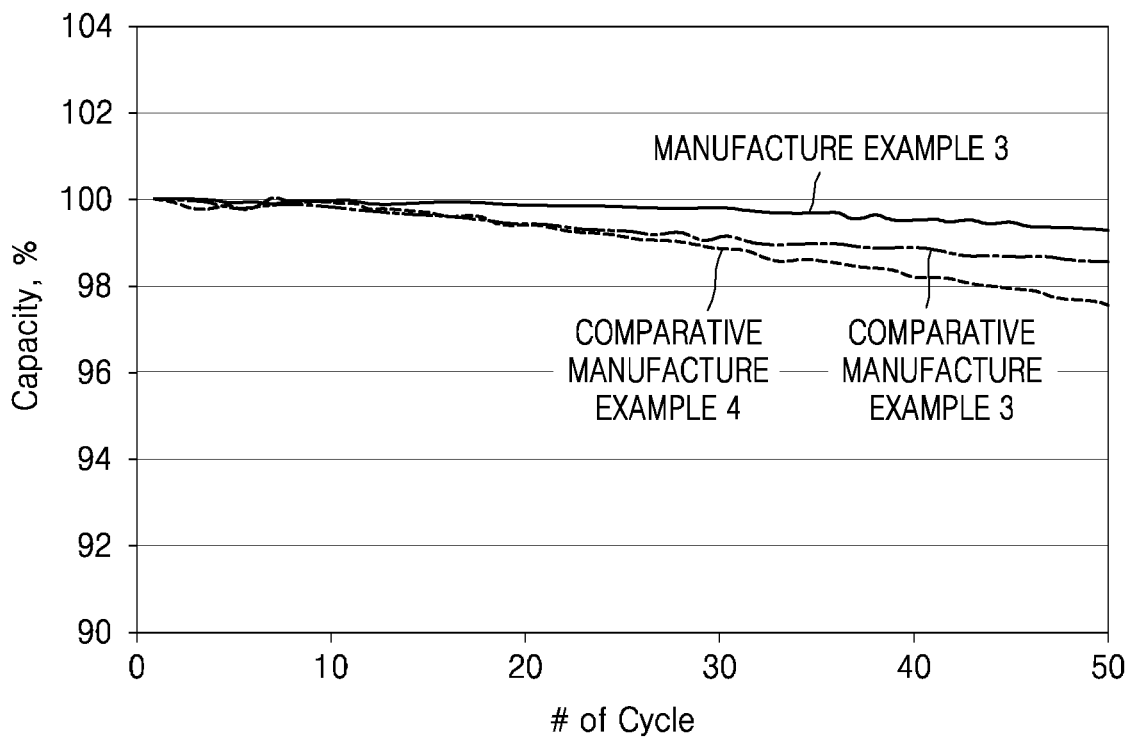
FIG. 5 is a graph that shows a change in discharge capacity according to the number of cycles in each of coin cells prepared in Manufacture Example 3 and Comparative Manufacture Examples 3 and 4.
Figure 6:
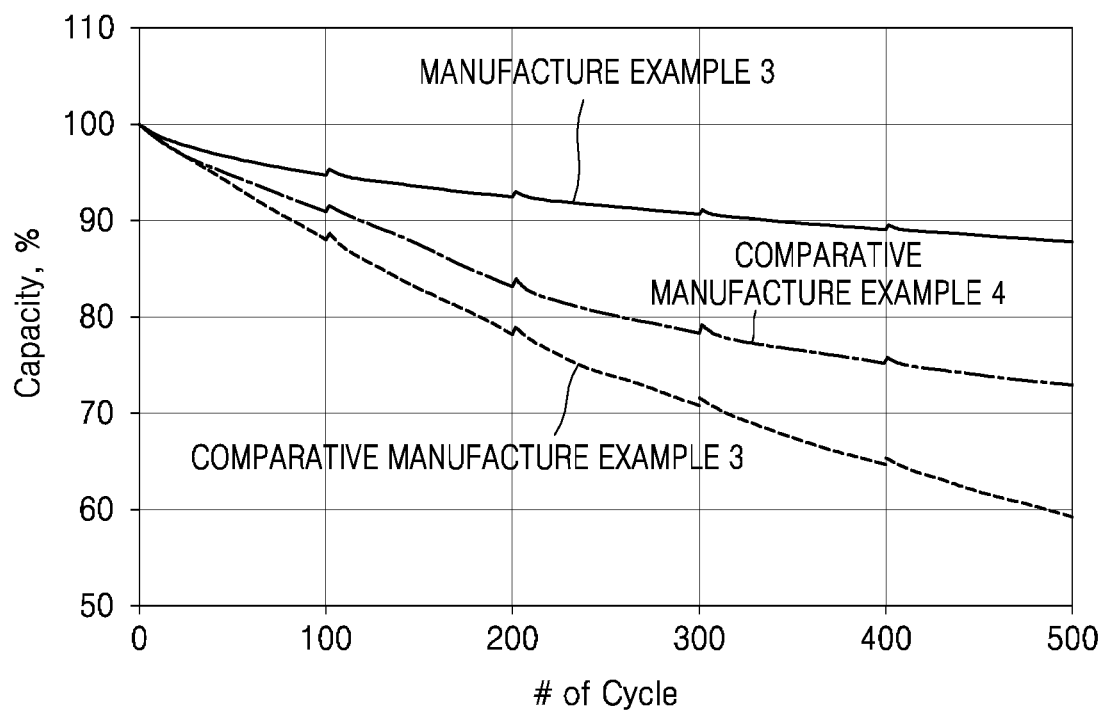
FIG. 6 is a graph that shows a change in discharge capacity according to the number of cycles in each of full cells prepared in Manufacture Example 3 and Comparative Manufacture Examples 3 and 4.

The results of evaluation of the charging/discharging characteristics are shown in FIGS. 5-6.

Referring to FIGS. 5-6, the full cell prepared in Manufacture Example 3 had improved lifespan characteristics compared to those of the full cells prepared in Comparative Manufacture Examples 3 and 4.

Evaluation Example 5: Scanning Electron Microscope

SEM analysis was performed on cross-sections of the positive electrodes prepared in Manufacture Example 1 and Comparative Manufacture Example 1. The SEM used herein was a Magellan 400 L (manufactured by FEI Company).

Referring to the results of the SEM analysis of the positive electrodes prepared in Manufacture Example 1 and Comparative Manufacture Example 1, it was confirmed that, unlike the positive electrode of Comparative Manufacture Example 1, the positive electrode of Manufacture Example 1 contained a positive active material having a structure in which radial centers were empty. When the positive electrode of Manufacture Example 1 is used, stress on the positive active material in the positive electrode is suppressed or reduced due to a buffer effect on changes in volume during a charge/discharge process.

As described above, according to one or more embodiments, a nickel-based active material for a lithium secondary battery may have a decreased lithium diffusion resistance. When a lithium secondary battery includes a positive electrode containing the nickel-based active material, the lithium secondary battery may have improved discharge capacity and charging/discharging efficiency and long lifespan characteristics.

It should be understood that embodiments described herein should be considered in a descriptive sense only and not for purposes of limitation. Descriptions of features or aspects within each embodiment should typically be considered as available for other similar features or aspects in other embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more embodiments have been described with reference to the figures, it will be understood by those of ordinary skill in the art that various changes in form and details may be made therein without departing from the spirit and scope as defined by the following claims, and equivalents thereof.

What is claimed is:

1. A nickel-based active material for a lithium secondary battery, the nickel-based active material comprising:
    at least one secondary particle comprising at least two primary particle structures,
    wherein the at least two primary particle structures each comprise a porous inner portion and an outer portion comprising a radially arranged structure,
    wherein the at least one secondary particle comprises at least two radial centers,
    wherein the at least two primary particle structures each comprise an agglomeration of at least two primary particles, and
    wherein respective ones of the at least two primary particles of each primary particle structure are radially arranged around a respective one of the at least two radial centers.

2. The nickel-based active material of claim 1, wherein the at least two primary particle structures are aligned in a multicenter isotropic arrangement to form the secondary particle.

3. The nickel-based active material of claim 1, wherein the at least two primary particle structures have a plurality of particle shapes, and
    wherein a sphericity of the most abundant particle shape of the at least two primary particle structures have is in a range of about 0.960 to about 0.985.

4. The nickel-based active material of claim 1, wherein a size of each of the at least two primary particle structures is in a range of about 2 μm to about 5 μm.

5. The nickel-based active material of claim 1, wherein a size of the at least one secondary particle is in a range of about 5 μm to about 25 μm.

6. The nickel-based active material of claim 1, wherein a pore size of the porous inner portion is in a range of about 150 nm to about 1 μm, a porosity of the porous inner portion is in a range of about 5% to about 15%, and a porosity of the outer portion having a radially arranged structure is in a range of about 1% to about 5%.

7. The nickel-based active material of claim 1, further comprising a plate particle of which a long axis is aligned in a radial direction, and a ratio of a thickness to a length of the plate particle is in a range of about 1:2 to about 1:20.

8. The nickel-based active material of claim 1, wherein the nickel-based active material comprises a compound represented by Formula 1:

$$Li_a(Ni_{1-x-y-z}Co_xMn_yM_z)O_2 \quad \text{Formula 1}$$

wherein, in Formula 1, M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al); and a, x, y, and z satisfy the following conditions: $0.95 \leq a \leq 1.3$, $x \leq (1-x-y-z)$, $y \leq (1-x-y-z)$, $0 < x < 1$, $0 \leq y < 1$, $0 \leq z < 1$, and $0 < (1-x-y-z) < 1$.

9. The nickel-based active material of claim 8, wherein an amount of nickel in the nickel-based active material is in a range of about 30 mol % to about 95 mol % based on a total amount of transition metals including nickel, cobalt, and manganese, the amount of nickel being higher than an amount of each of manganese and cobalt.

10. The nickel-based active material of claim 1, wherein the nickel-based active material comprises $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, and/or $LiNi_{0.85}Co_{0.1}Al_{0.05}O_2$.

11. A method of preparing a nickel-based active material for a lithium secondary battery, the method comprising:
   primary heat-treating a mixture of a lithium precursor and a metal hydroxide in an oxidative gas atmosphere at a temperature in a range of about 600° C. to about 850° C.; and
   secondary heat-treating the mixture in an oxidative gas atmosphere at a temperature in a range of about 700° C. to about 950° C. to prepare the nickel-based active material of claim 1.

12. The method of claim 11, wherein the secondary heat-treating is performed at a temperature higher than that of the primary heat-treating.

13. A lithium secondary battery comprising:
   a positive electrode comprising the nickel-based active material of claim 1;
   a negative electrode; and
   an electrolyte between the positive electrode and the negative electrode.

14. The lithium secondary battery of claim 13, wherein a sphericity of particles in the positive electrode is in a range of about 0.960 to about 0.985.

* * * * *

UNITED STATES PATENT AND TRADEMARK OFFICE
CERTIFICATE OF CORRECTION

PATENT NO. : 10,833,329 B2
APPLICATION NO. : 15/829548
DATED : November 10, 2020
INVENTOR(S) : Jinhwa Kim et al.

Page 1 of 1

It is certified that error appears in the above-identified patent and that said Letters Patent is hereby corrected as shown below:

In the Claims

Column 20, Line 58, Claim 3 after "particle structures" delete "have"

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*